United States Patent Office 2,702,809
Patented Feb. 22, 1955

2,702,809

3β,7,11α-TRIHYDROXY-5-PREGNENE-20-ONE AND ESTERS THEREOF

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application August 26, 1953, Serial No. 376,737

8 Claims. (Cl. 260—397.45)

The present invention relates to the novel 3β,7,11α-trihydroxy-5-pregnene-20-one and esters thereof.

These novel compounds may be represented by the following formula:

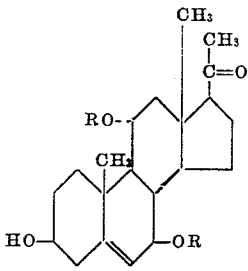

wherein R is hydrogen or a hydrocarbon-carboxylic acyl radical. The 3β,7,11α-trihydroxy-5-pregnene-20-one may be prepared by subjecting pregnenolone (3β-hydroxy-5-pregnene-20-one) to the oxygenating action of a culture of fungus of the order Mucorales as set forth in our application, of which the present application is a continuation-in-part, Serial No. 180,496, filed August 19, 1950, now abandoned, Serial No. 272,944, filed February 23, 1952, issued July 8, 1952 as Patent No. 2,602,769, and Serial No. 296,741, filed July 1, 1952, now abandoned.

It is an object of the present invention to prepare the novel 3β,7,11α-trihydroxy-5-pregnene-20-one and esters thereof. Other objects will be apparent to those skilled in the art to which this invention pertains.

The thermostable compounds of the present invention have demonstrated pharmacological properties such as anti-hypertensive anti-estrogenic, anti-testoid, anti-folliculoid, anti-progesterone, and anaesthetic activities. Furthermore, the 3β,7,11α-trihydroxy-5-pregene-20-one has additional value as a chemical intermediate, for example, 3β,7,11α-trihydroxy-5-pregnene-20-one may be reduced with lithium aluminum hydride in tetrahydrofurane to give 3β,7,11α,20-tetrahydroxy-5-pregnene, which may be oxidized with manganese dioxide in chloroform and at room temperature to 3β,11α,20-trihydroxy-5-pregnene-7-one. Reduction of this ketotriol by the Wolff-Kishner method results in 3β,11α,20-trihydroxy-5-pregnene which may be oxidized with chromic acid in acetic acid solution to 11-ketoprogesterone.

The following examples are illustrative of a process for the production of the products of the present invention but are not to be construed as limiting.

*Example 1.—3β,7,11α-trihydroxy-5-pregnene-20-one*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Eight liters of this sterilized medium was inoculated with *Rhizopus arrhizus*, ATCC 11145, and incubated for nineteen hours at a temperature of 28 degrees centigrade using a rate of aeration and stirring such that the oxygen uptake was 6.3 to 7 millimoles per hour per liter of Na2SO3 according to the method of Cooper, Fernstrom and Miller, Ind. Eng. Chem., 36, 504 (1944). To this medium containing a nineteen-hour growth of *Rhizopus arrhizus* was added two grams of pregnenolone (3β-hydroxy-5-pregnene-20-one) in twenty milliliters of acetone to provide a suspension of the steroid in the culture. After an additional 75-hour period of incubation under the same conditions of temperature and aeration, the beer and mycelium were extracted and concentrated. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with four liters of methylene chloride and then with three two-liter portions of methylene chloride. The combined methylene chloride extracts were washed with two one-tenth by volume portions of a two percent aqueous solution of sodium bicarbonate and then with two one-tenth by volume portions of water. After drying the methylene chloride extract with about three to five grams of anhydrous sodium sulfate per liter of solvent and filtering, the solvent was removed by distillation leaving 3.3162 grams of crystalline residue. This residue was dissolved in 200 milliliters of benzene and chromatographed over 100 grams of alumina (acid washed, dried at 120 degrees centigrate for four hours). The column was developed with 200-milliliter portions of solvents as indicated in the table.

Fractions 28 through 31 were combined, dissolved in ten milliliters of methanol, and concentrated until crystallization ensued. A few drops of water were added, the mixture was cooled, and the crystals were separated. Three recrystallizations from methanol, adding water to facilitate crystallization, or methanol-carbon tetrachloride yielded 375 milligrams of 3β,7,11α-trihydroxy-5-pregnene-20-one, melting point 247 to 248 and 250 to 255 degrees centigrade, $[\alpha]_D^{27}$ of minus 41 degrees (1.086 in methanol). Structure was verified by infrared spectra.

*Analysis.*—Percent calculated for $C_{21}H_{32}O_4$: C, 72.38; H, 9.25. Found: C, 72.34; H, 9.13.

Esters of 3β,7,11α-trihydroxy-5-pregnene-20-one are prepared according to various acylation procedures, as by reaction with ketene, ketenes of selected acids, selected acids, acid anhydrides, or acid chlorides, in an organic solvent such as pyridine or the like. The thus-described acylation process is productive of the mono-, di- and tri-esters of 3β,7,11α-trihydroxy-5-pregnene-20-one although in different proportions, depending upon the proportions of acylating agent to 3β,7,11α-trihydroxy-5-pregnene-20-one. Using one molar equivalent of acylating agent to said steroid produces predominantly the mono-acylated product, about two molar equivalents is productive of predominantly the di-ester whereas with about three molar equivalents or more the main product is the tri-ester of 3β,7,11α-trihydroxy-5-pregnene-20-one.

*Example 2.—3β,11α-diacetoxy-7-hydroxy-5-pregnene-20-one*

A 47-milligram sample of 3β,7,11α-trihydroxy-5-pregnene-20-one was dissolved in six milliliters of acetic anhydride and four milliliters of pyridine. The mixture was maintained at room temperature for fifty hours, thereupon diluted to 100 milliliters with water and extracted with ninety-, forty-, and forty-milliliter portions of ether. The combined ether extracts were washed with fifteen milliliters of water, twice with twenty-milliliter portions of normal hydrochloric acid, fifteen milliliters of water, three times with thirty-milliliter portions of seven percent sodium bicarbonate solution and three times with 25-milliliter portions of water. The ether solution was dried over anhydrous sodium sulfate and evaporated by a stream of air. The oily residue crystallized from 0.2 milliliter of methanol, and was twice recrystallized from two milliliters of acetone to which ether was added drop by drop until crystals of 3β,11α-diacetoxy-7-hydroxy-5-pregnene-20-one appeared and were removed by filtration.

*Example 3.—3β,11α-dipropionyloxy-7-hydroxy-5-pregnene-20-one*

In the same manner as given in Example 2, the 3β,11α-dipropionyloxy-7-hydroxy-5-pregnene-20-one is prepared using the equivalent proportion of propionic anhydride in place of acetic anhydride.

*Example 4.—3β,7,11α-triacetoxy-5-pregnene-20-one*

Otherwise in the same manner as given in Example 2, 3β,7,11α-triacetoxy-5-pregnene-20-one is prepared using six equivalents of acetic anhydride.

*Example 5.—3β,7,11α-tripropionyloxy-5-pregnene-20-one*

Otherwise in the same manner as given in Example 2, 3β,7,11α-tripropionyloxy-5-pregnene-20-one is prepared using six equivalents of propionic anhydride.

Other representative esters of 3β,7,11α-trihydroxy-5-pregnene-20-one which can be prepared in the same manner as above, include one to eight carbon atom carboxylic acid acyloxy esters of saturated or unsaturated aliphatic, carbocyclic, cycloaliphatic, aryl, arylalkyl, alkaryl, mono, di or polycarboxylic acids which forms ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like, if desired.

If a mixed ester involving three different acyl groups is desired the 3β,7,11α - trihydroxy - 5 - pregnene - 20 - one may be partially esterified with one acylating agent, the mono-ester esterified with an acylating agent which introduces a different acyl group, and the di-ester may then be completely esterified with a third acylating agent which introduces a third acyl group. Thus 3β-acetoxy-7 - dimethylacetoxy - 11α - β - cyclopentylpropionyloxy-5-pregnene-20-one or other mixed esters of the herein mentioned acid groups may be prepared.

TABLE

| Fraction | Solvent | Eluate Solids Milligrams |
|---|---|---|
| 1,2 | benzene | 195 |
| 3,4 | benzene plus 5 percent ether | 70 |
| 5-7 | benzene plus 10 percent ether | 56 |
| 8,9 | benzene plus 50 percent ether | 11 |
| 10,11 | ether | 7 |
| 12,13 | ether plus 5 percent CHCl₃ | 8 |
| 14,15 | ether plus 10 percent CHCl₃ | 32 |
| 16,17 | ether plus 50 percent CHCl₃ | 108 |
| 18,19 | chloroform | 590 |
| 20 | CHCl₃ plus 5 percent acetone | 37 |
| 21 | do | 24 |
| 22 | CHCl₃ plus 10 percent acetone | 43 |
| 23 | do | 37 |
| 24 | CHCl₃ plus 50 percent acetone | 171 |
| 25 | do | 155 |
| 26 | acetone | 399 |
| 27 | do | 110 |
| 28 | acetone plus 5 percent methanol | 244 |
| 29 | do | 125 |
| 30,31 | acetone plus 10 percent methanol | 118 |
| 32,33 | acetone plus 50 percent methanol | 73 |
| 34,35 | methanol | 27 |

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound represented by the structural formula:

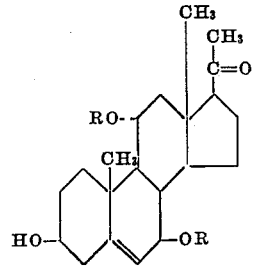

wherein R is selected from the radicals consisting of hydrogen and hydrocarbon-carboxylic acyl having less than nine carbon atoms.

2. 3β,7,11α-trihydroxy-5-pregnene-20-one.

3. 3β,7,11α-trihydroxy-5-pregnene-20-one esters of hydrocarbon-carboxylic acid having less than nine carbon atoms.

4. 3β,11α-diacetoxy-7-hydroxy-5-pregnene-20-one.

5. 3β,11α - dipropionyloxy - 7 - hydroxy - 5 - pregnene-20-one.

6. 3β,7,11α-triacyloxy-5-pregnene-20-one wherein acyloxy is a hydrocarbon-carboxylic radical containing less than nine carbon atoms.

7. 3β,7,11α-triacetoxy-5-pregnene-20-one.

8. 3β,7,11α-tripropionyloxy-5-pregnene-20-one.

No references cited.